Oct. 21, 1941.                    H. G. MOORE                       2,260,044
                                 CONTROL SYSTEM
                              Filed June 26, 1940
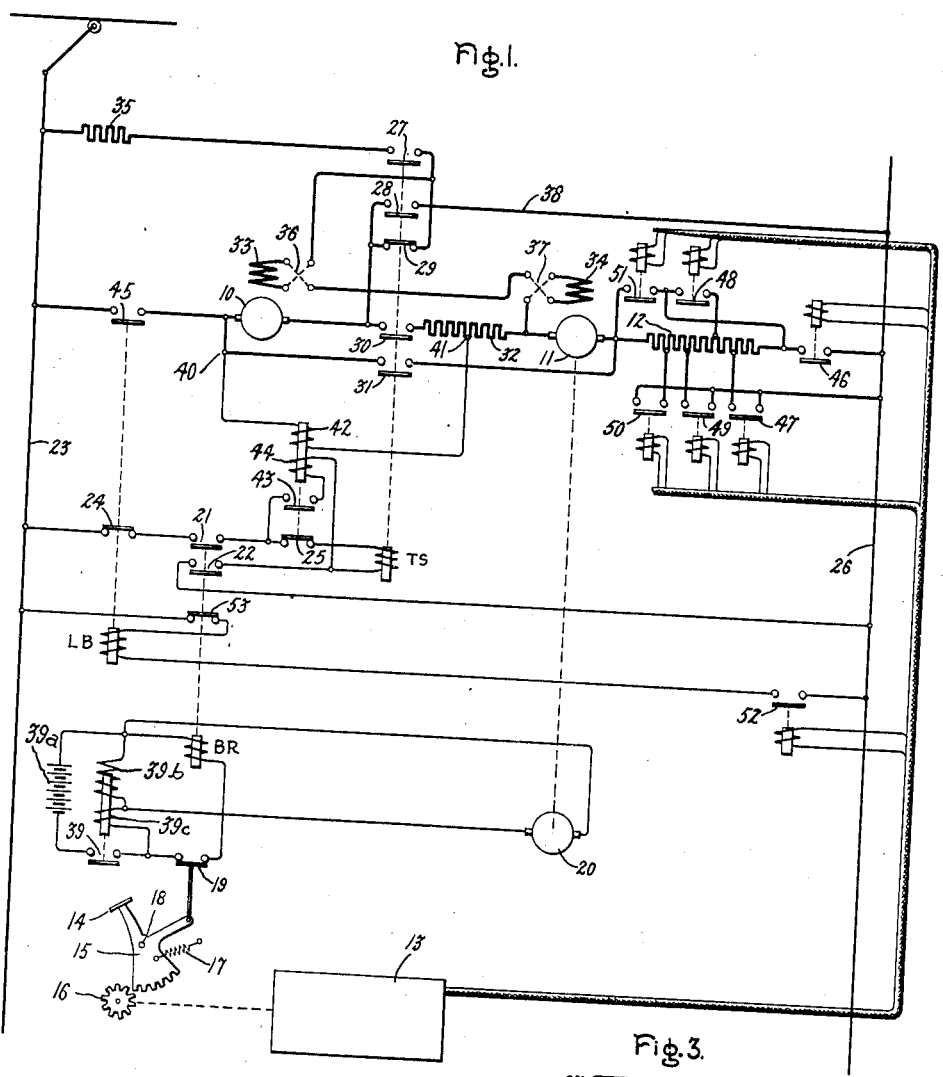
Fig. 1.
Fig. 2.
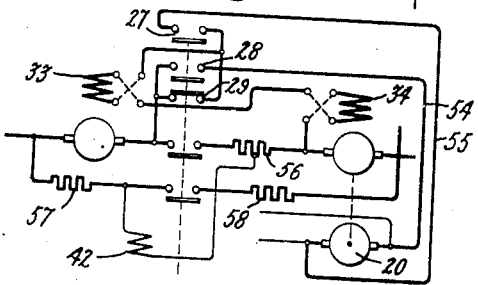
Fig. 3.
Inventor:
Harold G. Moore,
by Harry E. Dunham
His Attorney.

Patented Oct. 21, 1941

2,260,044

UNITED STATES PATENT OFFICE 2,260,044

CONTROL SYSTEM

Harold G. Moore, Wesleyville, Pa., assignor to General Electric Company, a corporation of New York Application June 26, 1940, Serial No. 342,518

12 Claims. (Cl. 172—179)

My invention relates to control systems for electric vehicles such as electric buses, railway cars, and the like, particularly to dynamic braking motor control systems for direct current series motors, and has for its object a simple and reliable system giving a substantially constant braking effort over a wide range of vehicle speed.

In carrying out my invention in one form, I excite separately during dynamic braking operation the series fields of the motors by connecting the fields in series with each other across a supply source and in series with at least a portion of the dynamic braking resistance which introduces a regulatory action so as to maintain a substantially constant braking effort over a substantially wide variation in motor and vehicle speed.

I also provide a manually operated controller for controlling the connections of the motors for both the motoring and braking operations, which controller is biased to a position to establish dynamic braking connections. I furthermore provide protective means responsive to a difference between the voltages of two motors for discontinuing dynamic braking together with holding means for said protective means and means responsive to movement of said controller from its dynamic braking position for disabling said holding means.

For a more complete understanding of my invention, reference should be had to the drawing, Fig. 1 of which is a diagrammatic representation of a control system embodying my invention; Fig. 2 is a sequence table for the switches or contactors during motoring operation; while Fig. 3 is a fragmentary diagram showing a modified form of my invention.

Referring to the drawing, I have shown my invention in one form as applied to two direct current series motors 10 and 11. These motors are connected in series with each other during motoring operation with a starting resistance 12 in their circuit. The motoring operation is controlled by means of a controller 13, preferably of a drum type, the rotatable element (not shown) of which is operated by a pedal 14 connected to operate a gear segment 15 meshing with a driving pinion 16 connected to the controller shaft. The gear sector 15 and the pedal 14 are biased as by a spring 17 in a counterclockwise direction about the pivot 18 to the position shown in the drawing in which the controller 13 is in its off position and the gear sector has moved a small distance out of engagement with the pinion 16.

In this released position of the pedal dynamic braking is started, assuming that the vehicle is moving at a dynamic braking speed such as a speed greater than 4 M. P. H. A switch 19 operated by the pedal is closed at this time and connects the BR coil across the battery charging generator 20. The generator 20 is suitably driven from the driving mechanism of the vehicle and, as shown, is connected to be driven by the motor 11. The BR coil picks up its armature and thereby closes its two switches 21 and 22 whereby a circuit is closed for the transfer switch operating coil TS. This circuit leads from one supply conductor 23 which may be connected to a trolley wire through an LB interlock switch 24, the switch 21, a flashover relay switch 25 which is closed, the TS coil and the switch 22 to the other supply conductor 26 which may be connected to ground or to a second trolley wire. The coil TS now picks up its armature and closes the TS switches 27, 28, 30 and 31 and opens the switch 29 to establish dynamic braking.

The dynamic braking circuit for the armatures 10 and 11 leads from the left-hand side of the armature 10 through the TS switch 31, the armature 11, the braking resistor 32 and the TS switch 30 to the other side of the armature 10. Also a circuit for the separate excitation of the series field windings 33 and 34 of the motors is established. This circuit leads from the conductor 23 through the resistor 35, the TS switch 27, the reversing switch 36 and the field winding 33, the reversing switch 37 and the field winding 34, the resistor 32, TS switch 30, TS switch 28 and the conductor 38 to the other supply conductor 26.

It will be observed that the separately excited circuit for the series field windings includes the dynamic braking resistance 32. Furthermore, the connections are such that the braking current voltage drop across the resistor 32 is in the same sense as the voltage drop of the supply source across the resistor. The current in the field windings is furthermore limited by the fixed resistance 35. Therefore, the voltage drop across the resistor 32 serves to regulate the field excitation of the motors to maintain thereby a substantially constant braking effort over a wide range of motor speeds. For example, at high car and motor speeds, the motor voltages, the motors acting as generators, tend to be high and tend to force relatively great braking currents through the braking resistor. The resulting high voltage drop across the resistor, which opposes the supply source voltage, serves to decrease the available supply source voltage for the field winding circuit and, therefore, decreases the excitation of the generators. In this manner, excessively high braking currents and braking efforts are prevented.

As the speed of the vehicle decreases, the voltages of the motors tend to decrease but the resulting decrease in braking current and voltage across the resistor 32 causes an increase of the current in the field windings whereby the excitations of the motors acting as generators is increased. In other words, the reduction in braking current is offset by the increased field strength so as to maintain a substantially constant braking effort. The field excitation is proportional to the difference between the supply source voltage and the voltage across the resistor 32. In a typical installation the dynamic braking effort expressed in pounds directly applied to the car varied 20 per cent over a speed range of 100 per cent.

When the vehicle speed decreases to a predetermined minimum value, such as 4 M. P. H., the voltage of the charging generator 20 constituting a speed responsive means decreases to a value at which the reverse current relay 39 opens disconnecting the storage battery 39a, also the BR coil can no longer hold up its armature, and the switches 21 and 22 thereupon open to interrupt the braking connections.

Any suitable charging regulator may be used to actuate the relay 39. As shown, it is actuated by two coils, a shunt coil 39b and a series coil 39c. These two coils are connected in opposition to each other in series across the battery, while the shunt coil 39b is also connected across the generator 20. Thus a battery discharge current of a predetermined value as occasioned by a low generator voltage neutralizes the shunt coil allowing the relay to open. When the generator voltage rises to a predetermined value the shunt coil closes the relay.

The flashover relay switch 25 is opened to deenergize the TS coil and discontinue the dynamic braking in the event that the speeds of the motor become greatly different or that one of the motors should flashover at the commutator while braking. Under normal braking conditions, the voltages generated by the two motor armatures will be the same. In the braking circuit, therefore, there will be no difference in potential between the point 40 on one side of the armatures and some point 41 on the resistor 32. The operating coil 42 for the flashover relay switch 25 is connected between these points. If either motor should flashover or the speed of one motor be greatly different due to wheel slippage, the coil 42 is energized by the unbalanced voltage resulting between the points 40 and 41. The coil 42 thereupon opens the relay switch 25 and closes its switch 43. The switch 43 energizes a holding coil 44 which holds the switch 25 open.

The holding coil 44 may be deenergized to reset the relay by advancing the pedal 14 so as to open the switch 19. The pedal may be released when the flashover or wheel slippage condition has been corrected and the braking connection will be reestablished.

For motoring operation, the pedal 14 is depressed bringing the sector 15 into engagement with the pinion 16 and rotating the controller 13. The controller 13 is suitably arranged to control the LB switch 45 and the resistance switches 46, 47, 48, 49, 50 and 51 in sequence as indicated in the sequence table, Fig. 2. It will be noted that the LB coil is energized through a relay switch 52 controlled by the controller 13 and through the BR interlock switch 53. Thus, in the first position of the controller 13, the LB switch 45 is closed and the switch 46 is closed to connect the two motor armatures in series with their field windings and the resistance 12 across the supply mains 23 and 26. This circuit leads from the main 23 through the LB switch 45, armature 10, TS switch 29, reversing switch 36 and the field winding 33, reversing switch 37 and the field winding 34, armature 11, resistance 12, and the switch 46 to the supply main 26. When the controller is advanced, sections of the resistance 12 are short circuited by the switches 47 to 51 inclusive thereby to accelerate the motors.

By means of this arrangement of the pedal operating means, the operator can control the speed of the vehicle by operating the controller 13 to the appropriate position. Coasting is obtained by moving the pedal to an intermediate off position, i. e., the position in which the gear segment 15 is about to disengage the pinion 16. In this position, the switch 19 is not as yet closed and, therefore, the braking connections are not established. In the event that dynamic braking is desired, the pedal is released. Preferably the pedal rises about one inch in moving from the coasting position to the final dynamic braking position. It is contemplated, of course, that when desirable, the electric braking will be supplemented by mechanical brakes (not shown) on the vehicle by means of which the operator can obtain rates of retardation greater than provided by the dynamic braking alone.

While the two motor armatures have been shown as connected in series with each other in the dynamic braking circuit, it will be understood that the armatures may be connected in parallel with each other across the braking resistance if desired. Furthermore, of course the system may be applied to a larger number of motors or to a single motor. The connections of the series fields may remain the same for any series or parallel combination of armature connections.

In Fig. 3 I have shown the system of Fig. 1 arranged with connections for excitation of the field windings 33 and 34 from the generator 20. The field windings are supplied through conductors 54 and 55 leading from opposite terminals of the generator 20 to the switches 27 and 28 whereby energy is supplied from the generator 20 instead of from the supply mains 23 and 26 of Fig. 1. In this modification, moreover, the dynamic braking resistance 32 of Fig. 1 is divided into three sections 56, 57 and 58, the section 56 having relatively low resistance, while the sections 57 and 58 have relatively high resistances equal to each other. The resistance 56 which gives the field regulatory action in the manner hereinbefore described in connection with the resistance 32 is made of a low ohmic value to correspond with the low voltage excitation supplied from the generator 20. The coil 42 is connected between a midpoint on the resistance 56 and a point between the two resistances 57 and 58.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States, is:

1. In a dynamic braking control system the combination of two series connected momentum driven dynamo electric machines each having an armature and a series field winding, electric supply connections, a dynamic braking resistor, switching means movable to connect said dynamic braking resistor across said armatures for dynamic braking, manual operating means for controlling said switching means biased to a position to operate said switching means to establish dynamic braking, relay means responsive to a difference between the voltages of said dynamo electric machines movable from one position to a second position to operate said switching means to discontinue dynamic braking, holding means for holding said relay means in said second position, and means responsive to movement of said manual operating means from said position for disabling said holding means.

2. In a dynamic braking control system the combination of two series connected momentum driven dynamo electric machines each having an armature and a series field winding, electric supply connections, a dynamic braking resistor, switching means movable to connect said dynamic braking resistor across said armatures for dynamic braking and to connect said field winding to said supply connections in series with at least a portion of said dynamic braking resistor in such direction that the dynamic braking voltage across said dynamic braking resistor opposes the voltage of said supply connections, manual operating means for controlling said switching means biased to a position to operate said switching means to establish dynamic braking, relay means responsive to a difference between the voltages of said dynamo electric machines for operating said switching means to discontinue dynamic braking, holding means for said relay means, and means responsive to movement of said manual operating means from said position for disabling said holding means.

3. In a control system the combination of a motor having an armature and a field winding, electric supply connections, switching means for connecting said motor to said supply connections for motoring operation, a dynamic braking resistor, a second switching means movable to a predetermined position to connect said resistor across said armature for dynamic braking and to connect said field winding to said supply connections in series with at least a portion of said dynamic braking resistor in such direction that the dynamic braking voltage across said resistor opposes the voltage of said supply connections, a common operating means for controlling said switching means, and means biasing said operating means to a predetermined position in which said second switching means is operated to said predetermined position to establish said dynamic braking connections and said first switching means is operated to disconnect said motor from said supply connections.

4. In a control system the combination of a motor having an armature and a field winding, electric supply connections, switching means for connecting said motor to said supply connections for motoring operation, a dynamic braking resistor, a second switching means biased to one position and movable to a second position to connect said resistor across said armature for dynamic braking, a third switching means biased to one position and movable to a second position to connect said field winding to said supply connections in series with at least a portion of said dynamic braking resistor in such direction that the dynamic braking voltage across said resistor opposes the voltage of said supply connections, and manual operating means for controlling said switching means biased to a predetermined position in which said second and third switching means are operated to establish dynamic braking of said motor and movable from said position to interrupt said dynamic braking connections and operate said first switching means for motoring operation.

5. In a control system the combination of a motor having an armature and a series field winding, electric supply connections, switching means for connecting said motor to said supply connections for motoring operation, a dynamic braking resistor, a second switching means biased to one position and movable to a second position to connect said resistor across said armature for dynamic braking, a second resistor, a third switching means biased to one position and movable to a second position to connect said field winding to said supply connections in series with said second resistor and in series with at least a portion of said dynamic braking resistor in such direction that the dynamic braking voltage across said resistor opposes the voltage of said supply connections, and manual operating means for controlling said switching means biased to a predetermined position in which said second and third switching means are operated to establish dynamic braking of said motor and movable from said position to interrupt said dynamic braking connections and operate said first switching means for motoring operation.

6. In a control system the combination of a motor having an armature and a field winding, electric supply connections, a controller for connecting said motor to said supply connections for motoring operation, a dynamic braking resistor, a switching means movable to a predetermined position to connect said resistor across said armature for dynamic braking, a common operating means for said controller and said switching means, and means biasing said operating means to a predetermined position in which said switching means is operated to said predetermined position to establish said dynamic braking connections and said controller is operated to disconnect said motor from said supply connections, and a lost motion connection between said operating means and said controller providing for movement of said operating means independently of said controller to discontinue dynamic braking.

7. In a control system the combination of a motor having an armature and a field winding, electric supply connections, switching means for connecting said motor to said supply connections for motoring operation, a dynamic braking resistor, a second switching means biased to an open position and movable to a closed position to connect said resistor across said armature for dynamic braking, a third switching means biased to one position and movable to a second position to connect said field winding to said supply connections, and manual operating means for controlling said switching means biased to a predetermined position in which said switching means are operated to establish dynamic braking of said motor and movable from said position to an intermediate position to interrupt said dynamic braking connections and to a third position to operate said first switching means for motoring operation.

8. In a control system the combination of a motor having an armature and a series field winding, electric supply connections, switching means for connecting said motor to said supply connections for motoring operation, a dynamic braking resistor, a second switching means biased to one position and movable to a second position to connect said resistor across said armature for dynamic braking, a third switching means biased to one position and movable to a second position to connect said field winding to said supply connections in series with at least a portion of said dynamic braking resistor in such direction that the dynamic braking voltage across said resistor opposes the voltage of said supply connections, a single coil for moving when energized said second and third switching means to establish said connections for dynamic braking, a switch for energizing said coil, a controller for controlling said first switching means for motoring operation, manual operating means for said switch and said controller biased to a position to move said controller to an off position to deenergize said motor and to close said switch and energize said coil, and a loose connection between said manual means and said controller providing for movement of said manual means independently of said controller to close said switch and thereby establish dynamic braking connections after said controller has been moved to said off position.

9. In a control system the combination of a motor having an armature and a series field winding, electric supply connections, a motor starting and speed controlling resistor, switching means for connecting said motor to said supply connections and for controlling said resistor for motoring operation, a dynamic braking resistor, a second switching means biased to an open position and movable to a closed position to connect said dynamic braking resistor across said armature for dynamic braking, a field resistor, a third switching means biased to one position and movable to a second position to connect said field winding to said supply connections in series with said field resistor and in series with said dynamic braking resistor in such direction that the dynamic braking voltage across said resistor opposes the voltage. of said supply connections, a single coil for moving said second and third switching means to establish said connections for dynamic braking, a switch for energizing said coil, a controller for controlling said first switching means for motoring operation, manual operating means for said switch and said controller biased to a position to move said controller to an off position to deenergize said machine and to close said switch, and a loose connection between said manual means and said controller providing for movement of said manual means independently of said controller to close said switch and thereby establish dynamic braking connections after said controller has been moved to said off position.

10. In a control system the combination of a motor having an armature and a series field winding, electric supply connections, switching means for connecting said motor to said supply connections for motoring operation, a dynamic braking resistor, a second switching means biased to an open position and movable to a closed position to connect said resistor across said armature for dynamic braking, a second resistor, a third switching means biased to one position and movable to a second position to connect said field winding to said supply connections in series with said second resistor and in series with at least a portion of said dynamic braking resistor in such direction that the dynamic braking voltage across said resistor opposes the voltage of said supply connections, a single coil for moving when energized said second and third switching means to establish said connections for dynamic braking, a switch for energizing said coil, a controller for controlling said first switching means for motoring operation, manual operating means for said switch and said controller biased to a position to move said controller to an off position to deenergize said machine and to close said switch and energize said coil, and a loose connection between said manual means and said controller providing for movement of said manual means independently of said controller to close said switch and thereby establish dynamic braking connections after said controller has been moved to said off position.

11. In a control system the combination of a momentum driven generator, a dynamic braking resistor, switching means movable to a predetermined position to connect said resistor to said generator for dynamic braking, a coil for operating said switching means, a storage battery, a charging generator driven by said first generator, means for connecting said battery to said charging generator, connections for connecting said coil across said charging generator, a control switch in the circuit of said coil, manually operated means for operating said control switch, and means for biasing said manually operated means to a position to close said control switch thereby to establish dynamic braking connections.

12. In a control system the combination of a motor, a controller for controlling the connections of said motor for motoring operation, a dynamic braking resistor, switching means movable to a predetermined position to connect said resistor to said motor for dynamic braking, a coil for operating said switching means, a storage battery, a generator driven by said motor for charging said storage battery, generator voltage and reverse current responsive means for connecting said battery to said generator, connections for connecting said coil across said generator, a control switch in the circuit of said coil, manually operated means for operating said controller and said control switch, and means for biasing said manually operated means to a position to close said control switch thereby to establish dynamic braking connections.

HAROLD G. MOORE.